United States Patent
Fukushima et al.

(10) Patent No.: US 10,730,702 B2
(45) Date of Patent: Aug. 4, 2020

(54) FLOOR CONVEYOR

(71) Applicant: Daifuku Co., Ltd., Osaka (JP)

(72) Inventors: Kazuaki Fukushima, Miyagi (JP);
Shotaro Kamiya, Shiga (JP);
Yoshikazu Hirokari, Shiga (JP);
Yoshitaka Ikeda, Osaka (JP)

(73) Assignee: Daifuku Co., Ltd. (JP)

( * ) Notice: Subject to any disclaimer, the term of this patent is extended or adjusted under 35 U.S.C. 154(b) by 453 days.

(21) Appl. No.: 15/787,835

(22) Filed: Oct. 19, 2017

(65) Prior Publication Data

US 2018/0118468 A1    May 3, 2018

(30) Foreign Application Priority Data

Oct. 31, 2016 (JP) .................. 2016-213120

(51) Int. Cl.
*B65G 35/06* (2006.01)

(52) U.S. Cl.
CPC .......... *B65G 35/06* (2013.01); *B65G 2207/40* (2013.01)

(58) Field of Classification Search
CPC ........ B61B 10/04; B65G 21/00; B65G 43/00; B65G 35/06
USPC .......... 198/345.3, 370.04, 465.1, 831, 836.1, 198/837, 842, 843
See application file for complete search history.

(56) References Cited

U.S. PATENT DOCUMENTS

| 5,845,582 A * | 12/1998 | Coester ................. B61B 13/122 |
| | | 104/156 |
| 10,359,234 B2 * | 7/2019 | Robbin .................... F26B 21/00 |

FOREIGN PATENT DOCUMENTS

JP         H07277178 A    10/1995

* cited by examiner

*Primary Examiner* — Gene O Crawford
*Assistant Examiner* — Lester III Rushin
(74) *Attorney, Agent, or Firm* — St. Onge Steward Johnston & Reens LLC

(57) ABSTRACT

A floor conveyor has a conveyed object support base portion supported on a conveying traveling body via a columnar support member that penetrates, in a vertical direction, a slit formed in a floor surface along a traveling path of the conveying traveling body. An auxiliary floor surface mechanism which narrows the width of the slit has protruding members protruding from the side of the slit to the center of the slit, where each of the protruding members includes a plate-shaped portion along a perpendicularly vertical direction and is held and biased by an elastic force in a protruding posture in which the protruding member protrudes to the center of the slit. When the protruding member contacts the columnar support member, the protruding member moves in the movement direction of the columnar support member against elasticity so as to allow the passage of the columnar support member.

8 Claims, 13 Drawing Sheets

FLOOR CONVEYOR

TECHNICAL FIELD

The present invention relates to a floor conveyor in which a conveyed object support base portion on the upper side of a floor surface is supported on a conveying traveling body on the lower side of the floor surface via a columnar support member that penetrates, in a vertical direction, a slit formed in the floor surface along a traveling path of the conveying traveling body.

BACKGROUND

In this type of floor conveyor, in order to narrow the width of the slit, it is necessary to narrow the width of a transverse sectional shape of the columnar support member supporting the conveyed object support base portion on the upper side of the floor surface. On the other hand, in order to obtain necessary load-bearing performance, the length in a traveling direction is lengthened. Since in general, two front and rear portions of the conveyed object are supported by the columnar support members, the two front and rear columnar support members are configured so as to maintain a fixed posture relative to each other. Consequently, when the conveying traveling body on the lower side of the floor surface travels along a horizontal curved path section, the two front and rear columnar support members move within the slit in the horizontal curved path section so as to have an oblique posture in plain view, and thus it is necessary to widen the width of the slit in the horizontal curved path section. If the width of the slit is wide, when the conveying traveling body does not travel, there is a danger that a foreign object or a foot of an operator walking on the floor surface is caught therein. In order to avoid such a danger, for example, as disclosed in Japanese Published Unexamined Patent Application No. H07-277178 (Patent Literature 1), it is considered that an auxiliary floor surface member which is normally in such a horizontal posture so as to narrow the width of the slit but which is pushed upward by the columnar support member when the columnar support member passes therethrough is additionally provided on a side of the slit in the horizontal curved path section.

SUMMARY OF THE INVENTION

The configuration described in Japanese Published Unexamined Patent Application No. H07-277178 (Patent Literature 1) is such that arc-shaped auxiliary floor surface members which are divided so as to be small in the traveling direction are supported with a shaft such that the auxiliary floor surface members can be moved vertically and are held in the horizontal posture by a spring, and the passing columnar support member is pressed against an oblique side formed at a tip end of the auxiliary floor surface member such that the auxiliary floor surface member moves upward against the biasing force of the spring. Therefore, for example, a stopper which receives the auxiliary floor surface member in the horizontal posture is needed such that a large number of components are needed and that the material cost and the assembly cost are increased, and moreover, the movement direction of the columnar support member on the side of the conveying traveling body and the upward movement direction of each of the auxiliary floor surface members perpendicularly intersect each other. Therefore, when the columnar support member passes while pushing up each of the auxiliary floor surface members, a significantly large frictional force acts therebetween, with the result that not only noise is produced but also the wear of sliding contact portions of the columnar support member and the auxiliary floor surface members and the resulting scattering of dust can be considered depending on the materials of the columnar support member and the auxiliary floor surface members.

The present invention proposes a floor conveyor which can solve the conventional problems as described above, and for ease of understanding of a relationship with embodiments which will be described later, the floor conveyor according to the present invention will be shown with reference symbols which are used in the description of the embodiments and which are placed in parentheses. A floor conveyor is provided in which a conveyed object support base portion (10, 11) on the upper side of a floor surface is supported on a conveying traveling body (1) on the lower side of the floor surface via a columnar support member (7, 8) that penetrates, in a vertical direction, a slit (24) formed in the floor surface (22) along the traveling path of the conveying traveling body (1), and in which in at least a horizontal curved path section (29) of the traveling path, an auxiliary floor surface means (38) for narrowing the width of the slit (24) is additionally provided, where the auxiliary floor surface means (38) is configured by juxtaposing, in the length direction of the slit (24), protruding members (43a) protruding from the side of the slit (24) to a center side of the width of the slit (24) with appropriate intervals, each of the protruding members (43a) includes a plate-shaped portion along a perpendicularly vertical direction and is held and biased by an elastic force in a protruding posture in which the protruding member (43a) protrudes to the center side of the width of the slit (24) and it is configured such that, when the protruding member (43a) is brought into contact with the columnar support member (7, 8), the protruding member (43a) moves in the movement direction of the columnar support member (7, 8) against elasticity so as to allow passage of the columnar support member (7, 8).

In the configuration of the present invention described above, the protruding members configuring the auxiliary floor surface means pivotally support the vertically oriented plate member such that the plate member freely pivotally swings horizontally forward/backward in the traveling direction, and can hold the plate member in the protruding posture with a spring. However, according to the configuration of the present invention, it is configured such that the protruding members configuring the auxiliary floor surface means include the plate-shaped portion along the perpendicularly vertical direction. Therefore, it can be configured such that each of the protruding members in the auxiliary floor surface means is configured with a vertically long rectangular elastic plate whose plate surface is in the perpendicularly vertical direction, each of the protruding members is attached so as to have the protruding posture, and when the protruding member is brought into contact with the columnar support member, the protruding member itself elastically deforms in the movement direction of the columnar support member. In addition, by further developing this configuration, it can be made possible that the auxiliary floor surface means is formed by bending a strip elastic member in the shape of waves, each of U-shaped portions protruding to the center side of the width of the slit forms the two protruding members, and a plate portion which is located between the adjacent U-shaped portions and which is along the length direction of the slit is made to serve as an attachment plate portion.

In other words, according to the configuration of the present invention, by only using the plate-shaped elastic member, a significantly simple configuration without a pivotal support portion formed with a support shaft or a spring as conventionally known can be realized, and the present invention can be implemented significantly inexpensively. As a matter of course, as described above, the present invention can be implemented even with a configuration where the vertically oriented plate member is pivotally supported so as to freely pivotally swing horizontally forward/backward in the traveling direction, and the plate member is held in the protruding posture with a spring. However, even in such a configuration using the pivotal support portion or the spring described above, as compared with a conventional configuration in which a foreign object or a foot of an operator which is to drop into the slit is received by a horizontally oriented plate member, it is not necessary to provide a stopper for overcoming a load acting downward on the plate member so as to hold the plate member in a desired posture, with the result that it is possible to reliably prevent a foreign object or a foot of an operator from dropping into the slit even with a relatively thin plate member. In addition, as compared with the conventional configuration, in the configuration of the present invention, the movement direction of the columnar support members on the side of the conveying traveling body and the motion direction of the protruding members configuring the auxiliary floor surface means coincide with each other, and thus it is also possible to reduce noise and wear caused by friction produced therebetween, the scattering of dust and the like.

In a case where the present invention is implemented, as described above, it can be configured such that the protruding member (43a) configuring the auxiliary floor surface means (38) is configured with the vertically long rectangular elastic plate whose plate surface is in the perpendicularly vertical direction, each of the protruding members (43a) is attached so as to have the protruding posture, and when the protruding member (43a) is brought into contact with the columnar support member (7, 8), the protruding member (43a) itself elastically deforms in the movement direction of the columnar support member (7, 8). In addition, by further developing this configuration, it can be made possible that the auxiliary floor surface means (38) is formed by bending the strip elastic member in the shape of waves, each of the U-shaped portions (43) protruding to the center side of the width of the slit (24) forms the two protruding members (43a), and the plate portion which is located between the adjacent U-shaped portions (43) and which is along the length direction of the slit (24) is made to serve as the attachment plate portion (40). By adopting the configuration described above, a significantly simple configuration without a pivotal support portion formed with a support shaft or a spring as conventionally known can be realized, and the present invention can be implemented significantly inexpensively.

Preferably, in a case where the width of the movement track of the columnar support members (7, 8) which move in the horizontal curved path section (29) expands to both left and right sides, the protruding members (43a) in the auxiliary floor surface means (38) are attached to both left and right sides of the slit (24), so as to narrow the width of the slit (24) from both sides. Furthermore, it can be configured such that a strip attachment plate (41) along the length direction of the slit (24) is attached to the lower side of a side edge of a floor plate member (32) forming the slit (24) which is adjacent to the slit (24) such that the plate surface thereof is in the perpendicularly vertical direction, and the protruding member (43a) in the auxiliary floor surface means (38) is attached to the plate surface of the strip attachment plate (41) on the side of the slit (24). Although the strip attachment plate (41) in this case can be configured to be integral with the floor plate member (32) by folding, in the downward direction, the strip regions (33a, 33b) of the floor plate member (32) adjacent to the slit (24), the strip attachment plate (41) can also be configured with a component other than the floor plate member (32).

It is noted that, although a patent literature is not shown, it is known that in order to prevent a foreign object from unexpectedly dropping from the slit, strip cover members (34a, 34b) are attached that are formed with two elastic plate members which extend to the center side of the width of the slit (24) from both left and right sides of the slit (24) and which cover the entirety of the slit (24). In a case where the present invention is implemented, by implementing in combination with the strip cover members (34a, 34b) formed with the conventionally known elastic plate members, it is made possible to reliably prevent, with the strip cover members, relatively small foreign objects from dropping through a space between the respective protruding members arranged at appropriate intervals in the length direction of the slit in the auxiliary floor surface means of the present invention. In a case of implementation in combination with the strip cover members (34a, 34b), on the upper sides of the strip regions (33a, 33b) of the floor plate members (32) on both sides of the slit (24) adjacent to the slit (24), proximal portions of a left and right pair of the strip cover members (34a, 34b) are placed, on the lower sides of the strip regions (33a, 33b), attachment plate portions (41a) of the strip attachment plates (41) to which the protruding members (43a) in the auxiliary floor surface means (38) are attached are overlaid, and the proximal portions of the strip cover members (34a, 34b) and the attachment plate portions (41a) can be attached to the strip regions (33a, 33b) in the floor plate members (32) with common fastening tools (36).

It is noted that, in the rectilinear path section (44) in the traveling path of the conveying traveling body (1), a specific path section in which the width of the movement track of the columnar support members (7, 8) is maintained at minimum is normally present. In the specific path section of the rectilinear path section (44) as described above, the auxiliary floor surface means (38) is not attached, and the widths of strip regions (33a, 33b) in floor plate members (32) on both sides of the slit (24) which have side edges adjacent to the slit (24) are widened such that the side edges of the strip regions (33a, 33b) adjacent to the slit (24) reach, in plain view, positions corresponding to the tip ends of the protruding members (43a) in the auxiliary floor surface means (38), with the result that it is possible to reliably prevent, with the floor plate members, a foreign object or a foot of an operator from dropping into the slit.

In some cases, in the traveling path of the conveying traveling body (1), a meeting (or branching) portion (46) V-shaped in plain view is provided in which a meeting (or branching) path section (45) is obliquely connected to a rectilinear path section (44). In such a position, a left and right pair of the auxiliary floor surface means (38) which are additionally provided in the slit (24) of the rectilinear path section (44) and the auxiliary floor surface means (38) on a side adjacent to the V-shape in plain view of a left and right pair of the auxiliary floor surface means (38) which are additionally provided in the slit (24) of the meeting (or branching) path section (45) form a terminal end directly in front of the meeting (or branching) portion (46). To the terminal end portion, a V-shaped fixed member (47) is attached which enters toward the inside of the meeting (or branching) portion (46) in a V-shape, which narrows the widths of the slits (24) in the rectilinear path section (44) of the meeting (or branching) portion (46) and in the meeting (or branching) path section (45) and which has a vertical plate surface. The left and right pair of the strip cover members (34a, 34b) which are additionally provided in the slit (24) of the rectilinear path section (44) and the strip cover member (34a, 34b) on a side adjacent to the V-shape in plain view of the left and right pair of the strip cover members (34a, 34b) which are additionally provided in the slit (24) of the meeting (or branching) path section (45) can be connected with a cover member (56) which covers the V-shaped fixed member (47), which enters toward the inside of the meeting (or branching) portion (46), which is formed with an elastic plate member, and which is formed in the shape of a triangle in plain view. According to this configuration, as compared with a case where the auxiliary floor surface means is disposed even in the V-shaped area in which the V-shaped fixed member is disposed, the slit of the rectilinear path section and the slit of the meeting or branching path section are connected in the shape of the letter V, and thus it is possible to reliably prevent a foreign object or a foot of an operator from dropping into the slit in the meeting or branching path section, where the width of the slit is widened, with the V-shaped fixed member which can easily enhance load-bearing performance as compared with the auxiliary floor surface means and the triangular cover member covering the top thereof, with the result that it is possible to enhance safety.

DETAILED DESCRIPTION OF THE INVENTION

Figure 1:
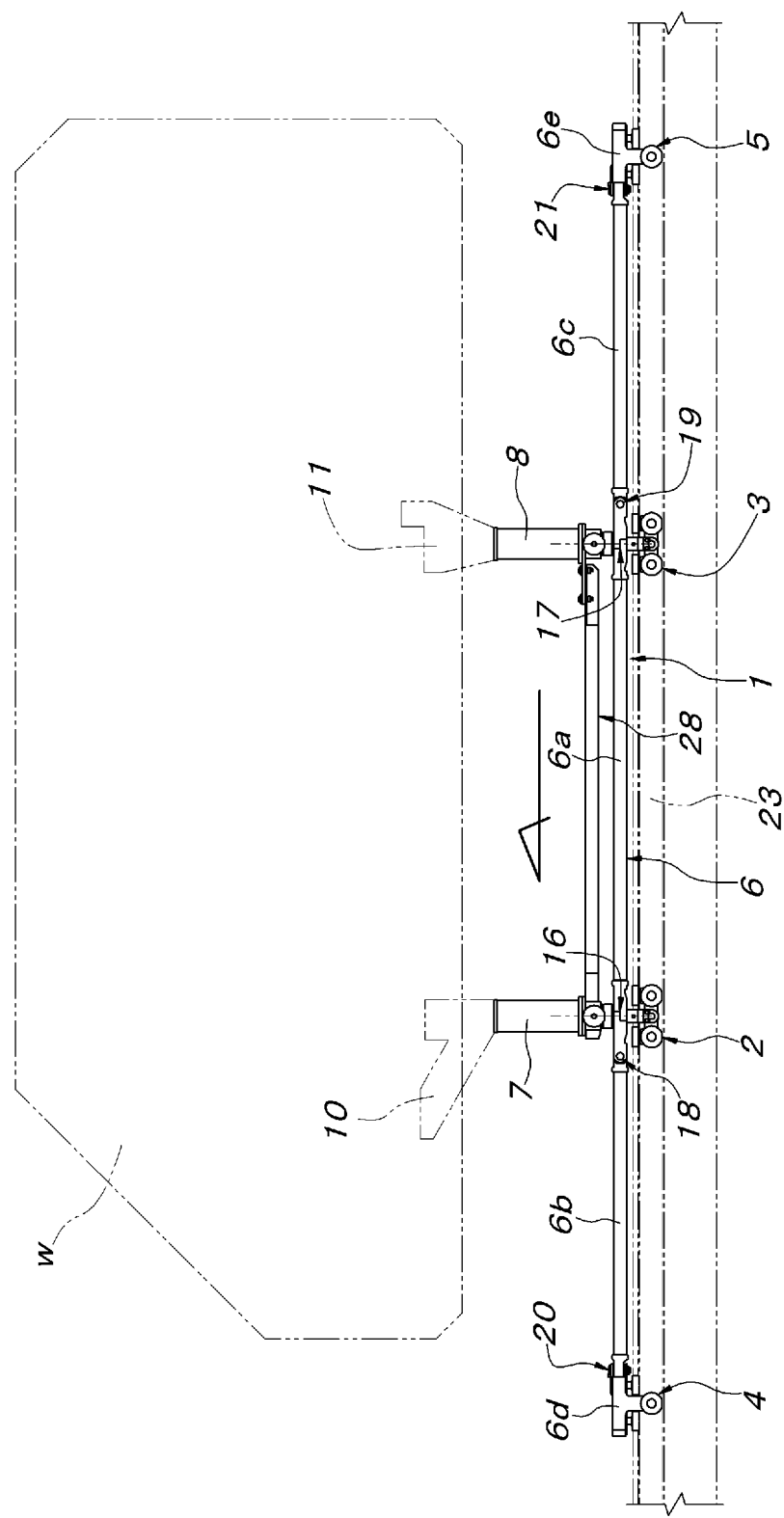
FIG. 1 is a side view illustrating the configuration of a conveying traveling body.

A conveying traveling body which is used in an embodiment of the present invention will be described with reference to FIGS. 1, 2 and 4. The conveying traveling body 1 is configured with two front and rear load trolleys 2 and 3, front and rear guide trolleys 4 and 5 at both ends, a load bar 6 which integrally couples these trolleys 2 to 5, columnar support members 7 and 8 which are provided on the respective load trolleys 2 and 3 so as to stand in a perpendicularly vertical direction, a horizontal coupling member 9 in a forward/backward direction which integrally couples both the columnar support members 7 and 8 on the upper side of the load bar 6, support base portions 10 and 11 which are provided on the upper ends of both the columnar support members 7 and 8 and which support two front and rear positions of a conveyed object W such as an automobile body, horizontal yoke members 12 and 13 which extend out from both the lower end portions of the columnar support members 7 and 8 to both left and right sides, and steady guide rollers 14 and 15 which are pivotally supported at the tip ends of both the horizontal yoke members 12 and 13 with support shafts oriented in a laterally horizontal direction.

The load bar 6 is configured with a center load bar unit 6a between the load trolleys 2 and 3, a front-side load bar unit 6b between the front-side load trolley 2 and the guide trolley 4, a rear-side load bar unit 6c between the rear-side load trolley 3 and the guide trolley 5, and front and rear load bar units 6d and 6e at both ends which are integral with both the front and rear guide trolleys 4 and 5. Between the center load bar unit 6a and both the front and rear load bar units 6b and 6c, horizontal swing joint portions 16 and 17 which allow a horizontal relative swing around vertical axes passing through both the centers of the load trolleys 2 and 3 and vertical swing joint portions 18 and 19 which allow a vertical relative swing of both the front and rear load bar units 6b and 6c with respect to the center load bar unit 6a are provided. Between both the front and rear load bar units 6b and 6c and the front and rear load bar units 6d and 6e at both ends, horizontal swing joint portions 20 and 21 which allow a horizontal relative swing around the vertical axes are provided. Both the load trolleys 2 and 3 are configured such that they can perform the horizontal relative swing around the vertical axes in the horizontal swing joint portions 16 and 17 and can also perform a vertical seesaw motion around left and right horizontal support shafts located between front and rear trolley rollers. Due to these configurations, the conveying traveling body 1 can travel along a horizontal curved path section and a gradient path second in the vertical direction.

Figure 3:
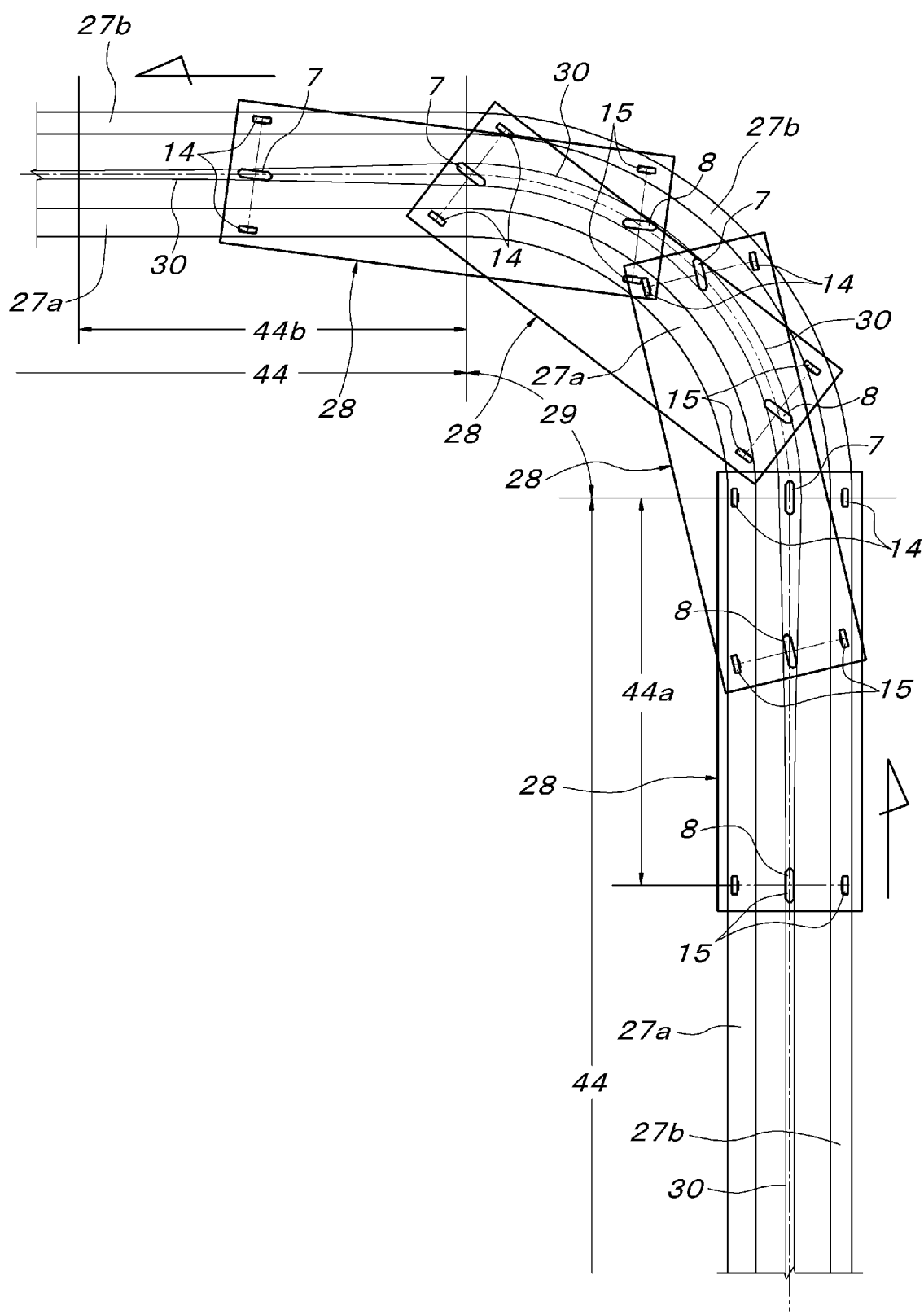
FIG. 3 is a plan view illustrating the movement track of columnar support members supporting conveyed object support base portions when the conveying traveling body travels in the horizontal curved path section.
Figure 4:
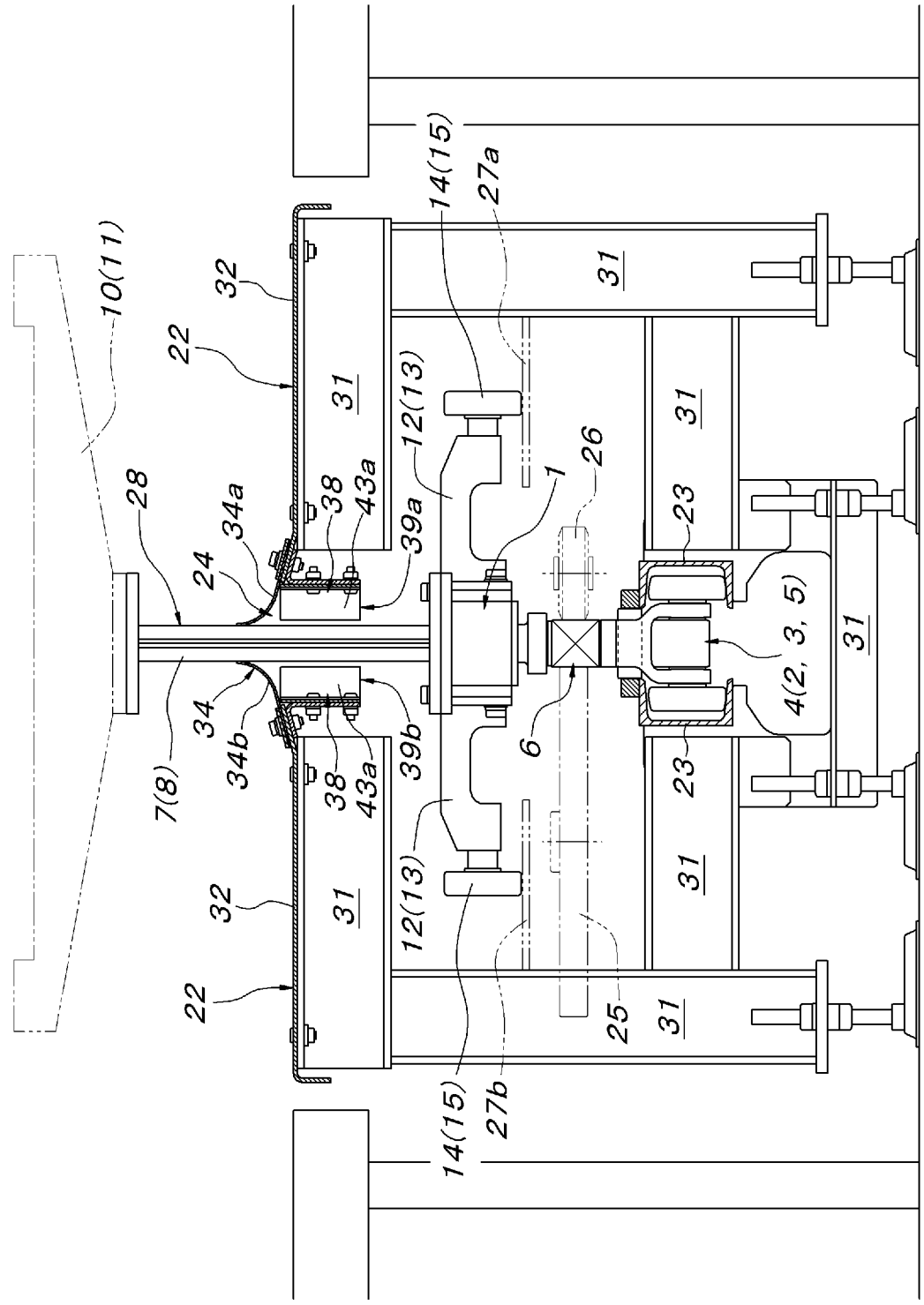
FIG. 4 is a vertical cross-sectional front view showing the conveying traveling body in a traveling path.

In the traveling path of the conveying traveling body 1, as shown in FIG. 4, on the lower side of a floor surface 22, a trolley guide rail 23 which supports and guides the respective trolleys 2 to 5 is placed, and in the floor surface 22, slits 24 which are penetrated by the two front and rear columnar support members 7 and 8 in the vertical direction are formed along the traveling path of the conveying traveling body 1. Although as a driving means which propels the conveying traveling body 1 along the traveling path, various types of driving means are known, in a case of the conveying traveling body 1 including the load bar 6, as conventionally known, a friction drive means is used which includes friction drive wheels 25 sandwiching the load bar 6 from both left and right sides and a backup roller 26. In specific regions of the traveling path of the conveying traveling body 1 such as the horizontal curved path section and a place where the conveyed object W is loaded and unloaded, etc., as indicated by imaginary lines in FIGS. 3 and 4, support plates 27*a* and 27*b* which support the steady guide rollers 14 and 15 at the tip ends of the horizontal yoke members 12 and 13 such that the steady guide rollers 14 and 15 can be freely rolled are placed along the traveling path of the conveying traveling body 1.

Figure 2:
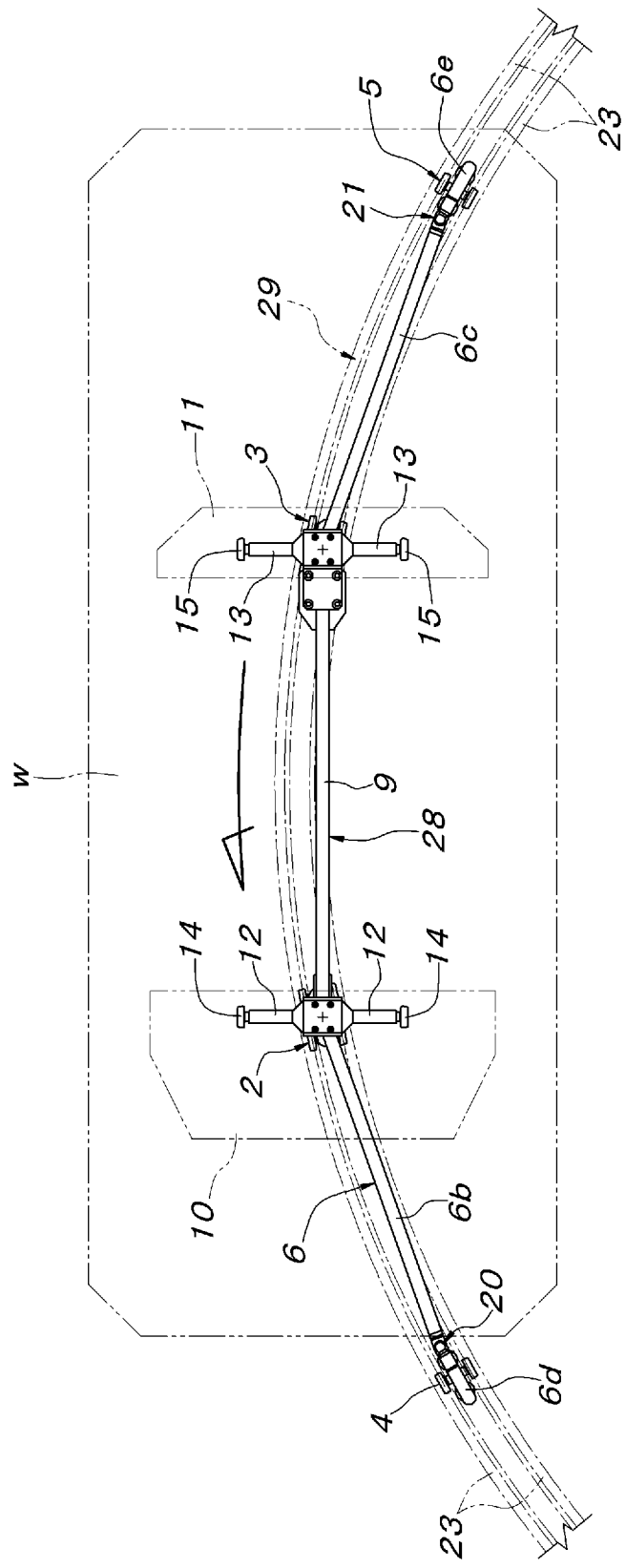
FIG. 2 is a plan view illustrating how the conveying traveling body travels in a horizontal curved path section.
Figure 5:
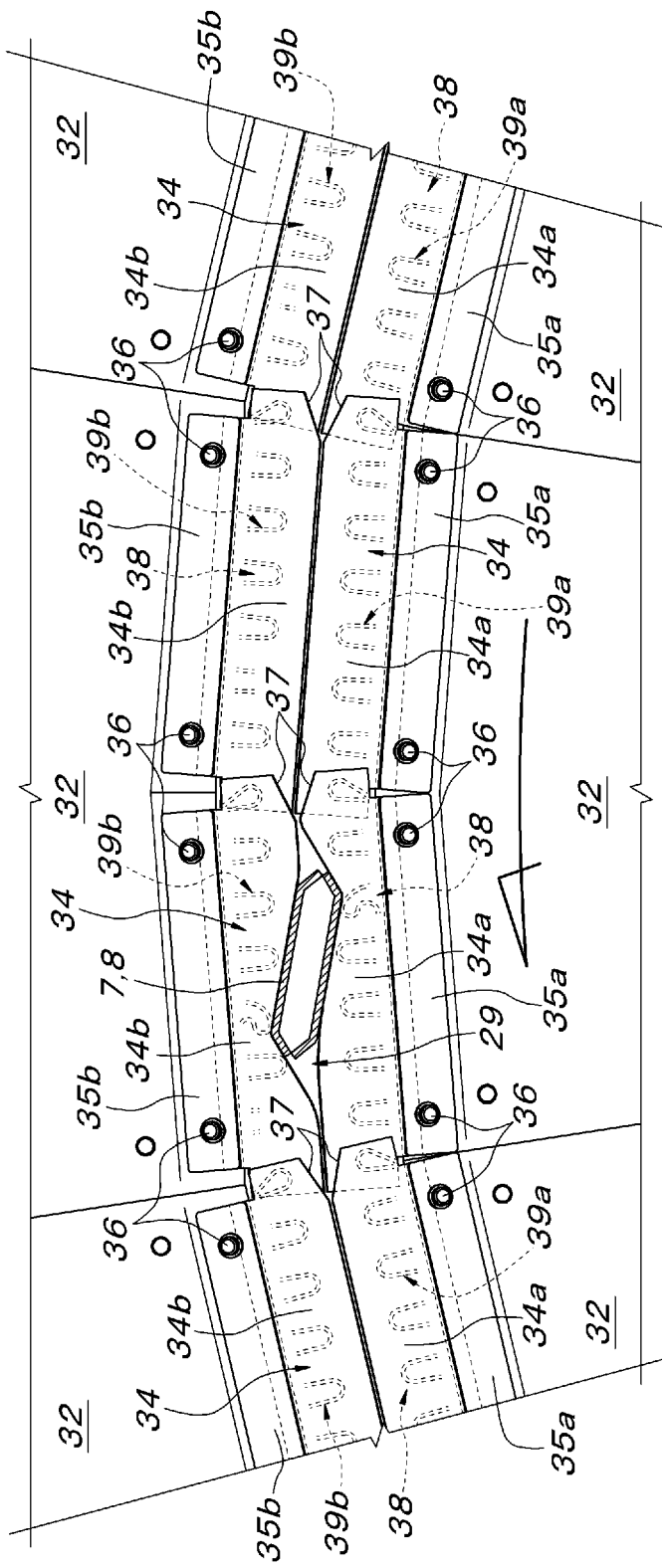
FIG. 5 is a plan view showing the horizontal curved path section in the traveling path.

A conveyed object support frame member 28 which is configured with the two front and rear columnar support members 7 and 8, the horizontal coupling member 9, the support base portions 10 and 11, and the horizontal yoke members 12 and 13 having the steady guide rollers 14 and 15 at the tip ends is integral, and as shown in FIG. 2, even when the conveying traveling body 1 travels along the horizontal curved path section, the conveyed object support frame member 28 maintains a fixed posture parallel to the center load bar unit 6*a* (in FIG. 2, the center load bar unit 6*a* is overlaid directly below the horizontal coupling member 9). On the other hand, since as shown in FIG. 4, the columnar support members 7 and 8 penetrate the slits 24 formed in the floor surface 22 in the vertical direction, in order to narrow the widths of the slits 24 and to obtain necessary strength, as shown in FIGS. 4 and 5, the columnar support members 7 and 8 are formed by stacking two vertically long rectangular plate members whose both front and rear sides are bent such that the transverse sectional shape thereof is long in the traveling direction and that both front and rear ends are tapered in the shape of the letter V.

Figure 9A:
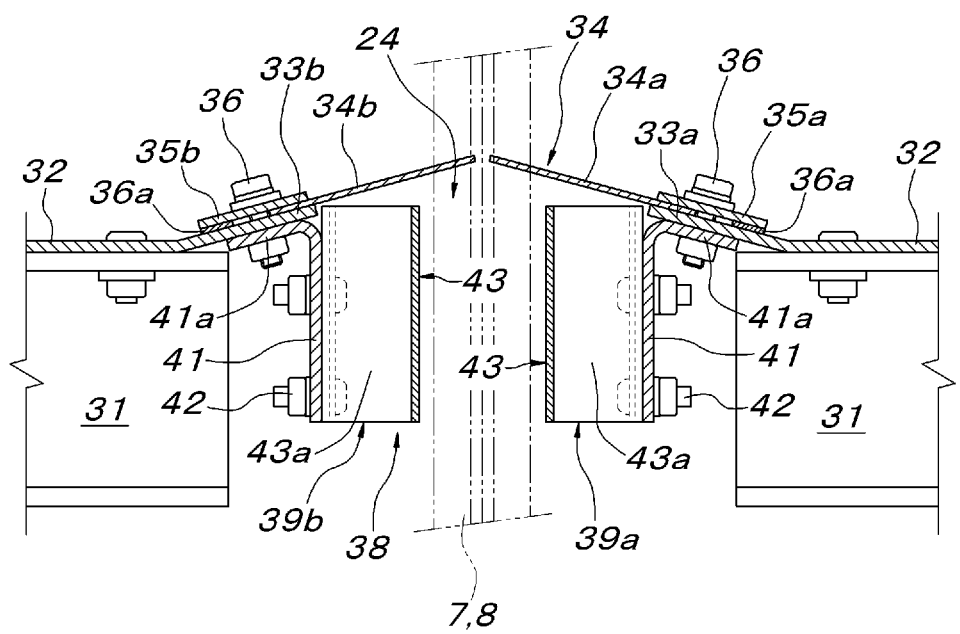
FIG. 9A is a vertical cross-sectional front view of the horizontal curved path section in the traveling path.
Figure 9B:
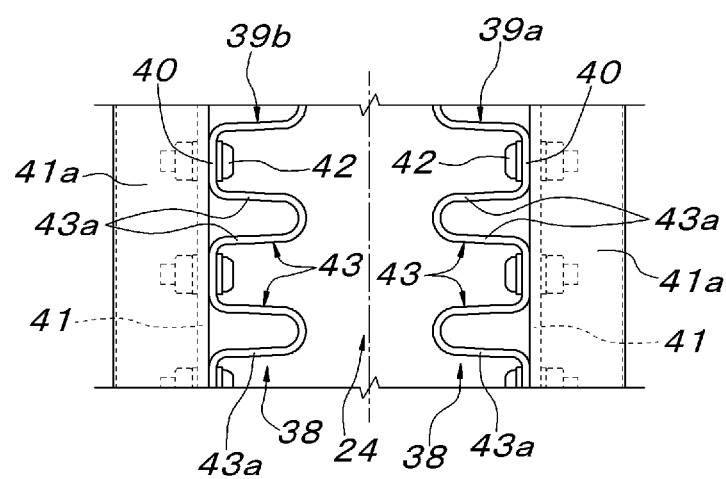
FIG. 9B is a plan view showing an auxiliary floor surface means.

Therefore, when the conveyed object support frame member 28 of the conveying traveling body 1 configured as described above travels along a horizontal curved path section 29 as shown in FIG. 3, the forward/backward longitudinal direction in the transverse sectional shape of the front and rear columnar support members 7 and 8 at both ends is inclined not in a tangential direction but obliquely with respect to the arc-shaped center line along the direction of the path of the horizontal curved path section 29, and the planar shape of the arc-shaped movement track 30 of the columnar support members 7 and 8 is gradually increased in width toward a center position in the direction of the path from the entrance of the horizontal curved path section 29 and is thereafter gradually decreased in width toward the exit of the horizontal curved path section 29. Therefore, the width of the slit 24 at least in the horizontal curved path section 29 in the traveling path of the conveying traveling body 1 is set slightly wider than the maximum width of the arc-shaped movement track 30 of the columnar support members 7 and 8 in the horizontal curved path section 29, to configure the slit 24. Specifically, as shown in FIGS. 4 and 9A, the floor surfaces 22 on both sides of the slit 24 are formed with floor plate members 32 that are laid on the upper side of a frame 31 to which the trolley guide rail 23, the friction drive means, and the support plates 27*a* and 27*b* are attached, strip regions 33*a* and 33*b* which have side edges of the floor plate members 32 adjacent to the slit 24 are inclined obliquely upward so as to be increased in height toward the side of the slit 24 and the slit 24 is formed between the inclined strip regions 33*a* and 33*b* on both left and right sides.

An embodiment of the present invention related to the slit 24 will be described below with reference to FIGS. 4 to 10. A cover 34 is placed on the slit 24 so as to prevent a foreign object from dropping into the slit 24. The cover 34 is configured with two strip cover members 34*a* and 34*b* that are formed with two elastic plate members parallel to the slit 24 and made of rubber or the like. In a state where the proximal portions (outer portions with respect to inner portions which overlaps the slit 24) of the respective strip cover members 34*a* and 34*b* are placed on the inclined strip regions 33*a* and 33*b* of the floor plate members 32 on both sides of the slit, the strip cover members 34*a* and 34*b* are attached onto strip regions 33*a* and 33*b* with strip holding members 35*a* and 35*b* and fastening tools 36 such as bolts and nuts. Therefore, both the strip cover members 34*a* and 34*b* are inclined obliquely upward along the inclined surfaces of the strip regions 33*a* and 33*b*, the upper edges thereof are adjacent to each other in the center position of the width of the slit 24 and thus the strip cover members 34*a* and 34*b* cover the entirety of the slit 24. It is noted that, although it may be configured such that the entire surfaces of the holding members 35*a* and 35*b* are overlaid on the proximal portions of the strip cover members 34*a* and 34*b* so that the fastening tools 36 also penetrate the strip cover members 34*a* and 34*b*, it is preferably configured such that, as shown in the detail view of FIG. 9A, the outer sides of the proximal portions of the strip cover members 34*a* and 34*b* are received by the fastening tools 36, and in the outer sides (opposite sides to the side where the slit 24 is present) of the fastening tools 36, strip spacers 36*a* which have substantially the same thickness as the strip cover members 34*a* and 34*b*, which are sandwiched between the holding members 35*a* and 35*b* and the strip regions 33*a* and 33*b* of the floor plate member 32, are interposed.

Figure 7:
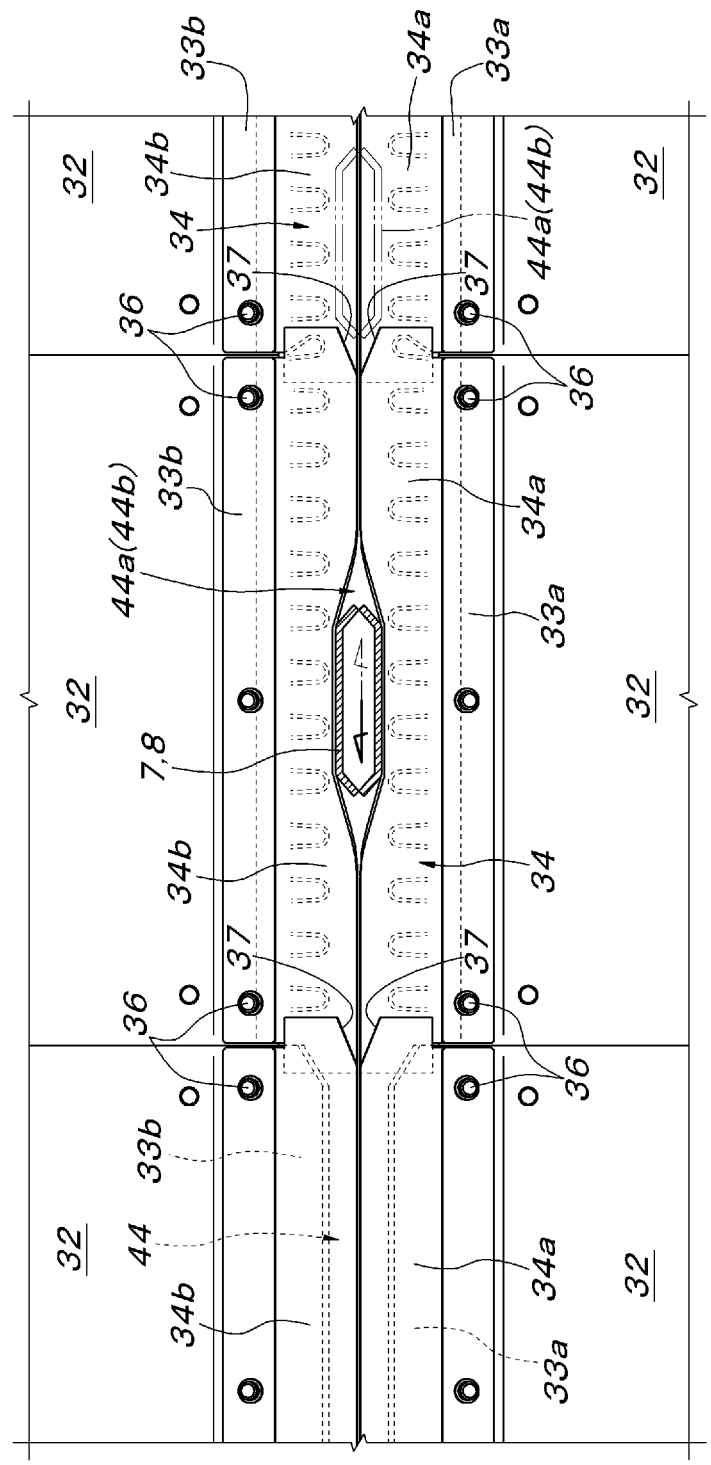
FIG. 7 is a plan view showing a rectilinear path section continuous with the horizontal curved path section in the traveling path.

As a matter of course, although the strip cover members 34*a* and 34*b* which have a required length are disposed so as to be continuous with the length direction of the slit 24, the end portions of the strip cover members 34*a* and 34*b* adjacent to the length direction of the slit 24 are configured such that the end portion on the downstream side in the traveling direction of the conveying traveling body 1 is overlaid on the end portion on the upstream side. Furthermore, as shown in FIGS. 5 and 7, of both the end portions of the strip cover members 34*a* and 34*b* in the length direction, at least the end portion on the downstream side in the traveling direction of the conveying traveling body 1 has an inclined side 37 forming an entrance extending outward so that the moving columnar support members 7 and 8 smoothly enter between the strip cover members 34*a* and 34*b*. Since the thus configured cover 34 protrudes in the shape of a mountain with respect to the floor surface 22, the operator walking on the floor surface 22 is aware of the presence of the slit 24 to draw the operator's attention, and at the same time, when the columnar support members 7 and 8 of the conveying traveling body 1 enter between the strip cover members 34*a* and 34*b*, together with the inclined side 37, as shown in FIG. 4, the strip cover members 34*a* and 34*b* are reliably curved upward, and thus the sides of both the strip cover members 34*a* and 34*b* are brought into sliding contact with the side surfaces of the columnar support members 7 and 8.

Among the slits 24, at least the slit 24 in the horizontal curved path section 29 in the traveling path of the conveying traveling body 1, an auxiliary floor surface means 38 which narrows the width of the slit 24 is additionally provided. The auxiliary floor surface means 38 is configured with wavy strip elastic members 39*a* and 39*b* which are disposed along the length direction of the slit 24 on both sides in the lower side of the slit 24. The wavy strip elastic members 39*a* and 39*b* are formed by bending a strip elastic member such as rubber in the shape of waves such that respective U-shaped portions are located at equal intervals in the length direction of the slit 24. An attachment plate portion 40 which is located between the respective U-shaped portions and which has a plate surface in the perpendicularly vertical direction along the length direction of the slit 24 is attached to the side edge of the floor plate member 32 forming the slit 24 adjacent to the slit 24, that is, a plate surface of a strip attachment plate 41 on the inner surface in the perpendicularly vertical direction which is disposed directly below the upper edge of the inclined strip regions 33*a* and 33*b* with two upper and lower fastening tools 42 such as bolts and nuts. An attachment plate portion 41*a* is provided outward from the upper edge thereof so as to be folded continuously to the strip attachment plate 41, and the attachment plate portion 41*a* is attached to the lower side of the inclined strip regions 33*a* and 33*b* in the floor plate member 32 forming the slit 24 with the fastening tools 36 for attaching the strip cover members 34*a* and 34*b*.

According to the configuration described above, as shown in FIG. 9B, a pair of front and rear plate-shaped portions in each of a U-shaped portions 43 in a left and right pair of wavy strip elastic members 39*a* and 39*b* forming the auxiliary floor surface means 38 are formed into a protruding member 43*a* configuring the auxiliary floor surface means 38. The protruding members 43*a* are juxtaposed, in the length direction of the slit 24, with appropriate intervals, and the protruding member 43*a* protrudes from the side of the slit 24 to the center side of the width of the slit 24, includes the plate-shaped portions along the perpendicularly vertical direction, and is held and biased by an elastic force in a protruding posture in which the protruding member 43*a* protrudes to the center side of the width of the slit 24. As any protruding member configuring the auxiliary floor surface means 38 may be adopted as long as the member has the features described above, it can also be configured without using the wavy strip elastic members 39*a* and 39*b*. For example, vertically long rectangular elastic plates with plate surfaces in the perpendicularly vertical direction which are juxtaposed, in the length direction, with appropriate intervals of the slit 24 may be adopted. In this case, the respective elastic plates are individually attached to the strip attachment plates 41 or the vertically long rectangular elastic plates are attached in advance, with appropriate intervals in the length direction of the slit 24, to the strip plates to be attached to the strip attachment plates 41.

The distance between the tip ends of the respective U-shaped portions 43 in a left and right pair of wavy strip elastic members 39*a* and 39*b* configuring the auxiliary floor surface means 38 is, as shown in FIG. 9A, slightly longer than the width of the columnar support members 7 and 8 in the conveying traveling body 1. The buckling strength of the left and right pair of the wavy strip elastic members 39*a* and 39*b* for a vertical load is high enough to receive one foot of the operator by a plurality of U-shaped portions 43 in the wavy strip elastic members 39*a* and 39*b*. Therefore, even when a relatively heavy item or a foot of the operator is caught into the slit 24 between the two front and rear conveying traveling bodies 1 in the traveling path by pushing and opening a left and right pair of the strip cover members 34*a* and 34*b* of the cover 34 covering the slit 24, the item or the foot of the operator can be received by a plurality of U-shaped portions 43 (a plurality of protruding members 43*a*) in the left and right pair of the wavy strip elastic members 39*a* and 39*b*.

Figure 6:
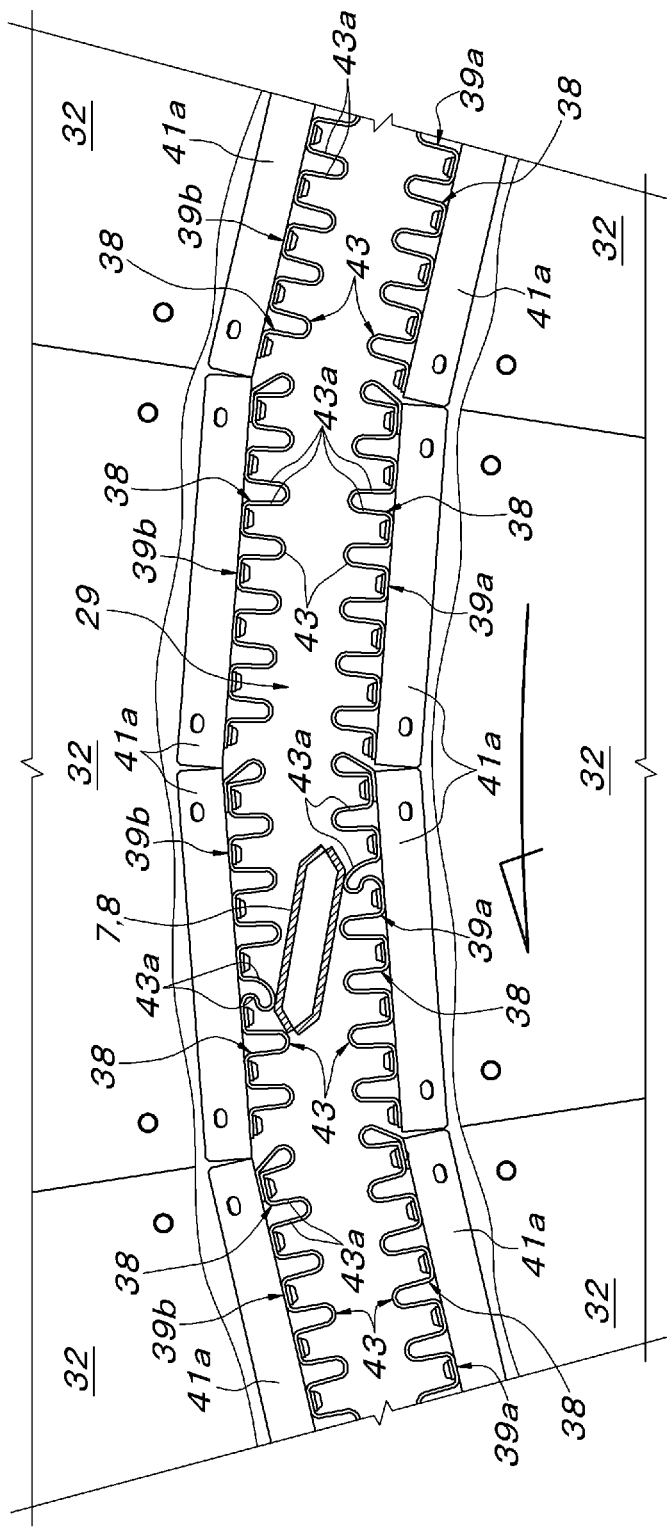
FIG. 6 is a plan view showing a state where a left and right pair of strip cover members in the horizontal curved path section are removed.

On the other hand, when the conveying traveling body 1 travels in a region where the auxiliary floor surface means 38 in the traveling path is additionally provided, for example, in the horizontal curved path section 29, as shown in FIG. 5, within the slit 24 in the horizontal curved path section 29, as described previously, in a state where the length direction of the transverse sectional shape of the columnar support members 7 and 8 is oblique with respect to the movement direction of the columnar support members 7 and 8 within the slit 24 in the horizontal curved path section 29, the columnar support members 7 and 8 move. The columnar support members 7 and 8 move while pushing and opening upward the left and right pair of the strip cover members 34*a* and 34*b* covering the slit 24 against the elasticity of themselves. For the auxiliary floor surface means 38 in the lower side of the cover 34, as shown in FIG. 6, the columnar support members 7 and 8 move to pass through the auxiliary floor surface means 38 while bending and deforming outward the respective U-shaped portions 43 (the protruding members 43*a*) in the left and right pair of the wavy strip elastic members 39*a* and 39*b* located in a position overlaid on the movement track of the front end portion and the rear end portion of the columnar support members 7 and 8 moving in the oblique state with the front end portion and the rear end portion of the columnar support members 7 and 8 against the elasticity of the U-shaped portions 43 (the protruding members 43*a*) themselves.

Figure 8:
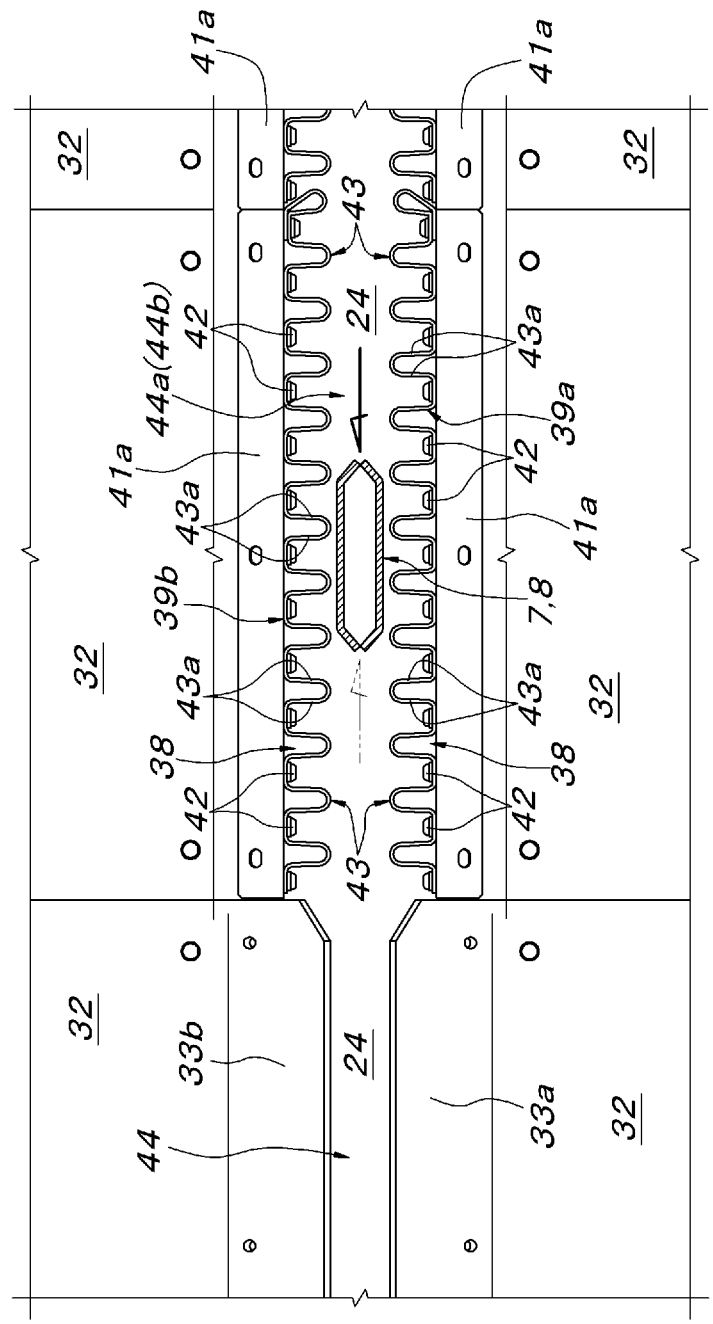
FIG. 8 is a plan view showing a state where a left and right pair of strip cover members in the rectilinear path section are removed.

As shown in FIG. 3, of rectilinear path sections 44 connected to the front and rear of the horizontal curved path section 29, an entrance-side specific section 44*a* from the start of the entrance of the front columnar support member 7 in the conveying traveling body 1 (the conveyed object support frame member 28) into the horizontal curved path section 29 to the completion of the entrance of the rear columnar support member 8 into the horizontal curved path section 29 is, as shown in the figure, a section in which the movement track 30 of both the front and rear columnar support members 7 and 8 is gradually increased in width, and an exit-side specific section 44*b* from the start of the leaving of the front columnar support member 7 from inside the horizontal curved path section 29 to the completion of the leaving of the rear columnar support member 8 from inside the horizontal curved path section 29 is, as shown in the figure, a section in which the movement track 30 of both the front and rear columnar support members 7 and 8 is gradually decreased in width. Therefore, even in the specific sections 44*a* and 44*b* of the rectilinear path sections 44, as shown in FIGS. 7 and 8, the auxiliary floor surface means 38 applied and implemented to the horizontal curved path section 29 is preferably provided. Even in the rectilinear path sections 44, except for the specific sections 44*a* and 44*b*, in which both the front and rear columnar support members 7 and 8 move in an orientation completely parallel to the movement direction, the auxiliary floor surface means 38 can be provided so that a heavy foreign object or a foot of the operator are prevented from dropping into the slit 24.

Figure 10:
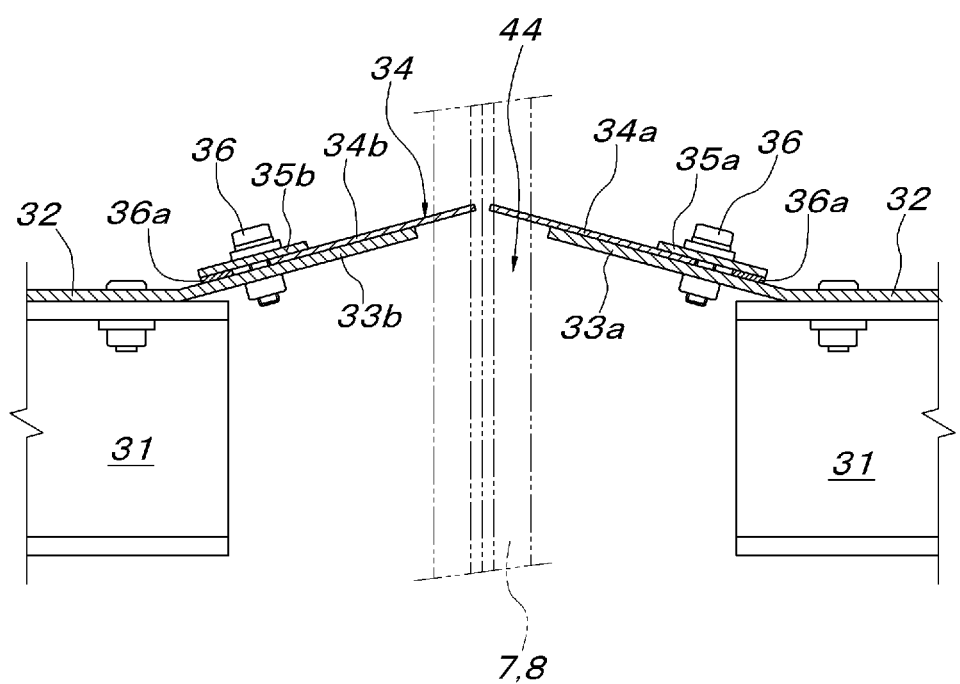
FIG. 10 is a vertical cross-sectional front view of the rectilinear path section in the traveling path.

However, in the rectilinear path sections 44 in which there is no possibility that both of the passing front and rear columnar support members 7 and 8 are brought into contact with the protruding members 43*a* in the auxiliary floor surface means 38 such as by swinging in the laterally left/right direction so as to deform the protruding members 43*a* against elasticity, as shown in FIGS. 7, 8, and 10, the auxiliary floor surface means 38 is not used, and instead, the width of the strip regions 33*a* and 33*b* in the floor plate members 32 on both sides of the slit 24 is widened toward the side of the slit 24, and thus the width of the slit 24 is narrowed so as to be substantially equal to the distance between the tip ends of the respective U-shaped portions 43 in the wavy strip elastic members 39*a* and 39*b* on both the left and right sides in the auxiliary floor surface means 38, with the result that it is possible to inexpensively and reliably prevent a heavy foreign object or a foot of the operator from dropping into the slit 24. It is noted that, although the strip regions 33a and 33b in the floor plate members 32 are configured by extending the floor plate members 32 themselves to the side of the slit 24, the strip regions 33a and 33b may be configured with floor plate members separate from the floor plate members 32 which configure only the strip regions 33a and 33b.

Figure 11A:
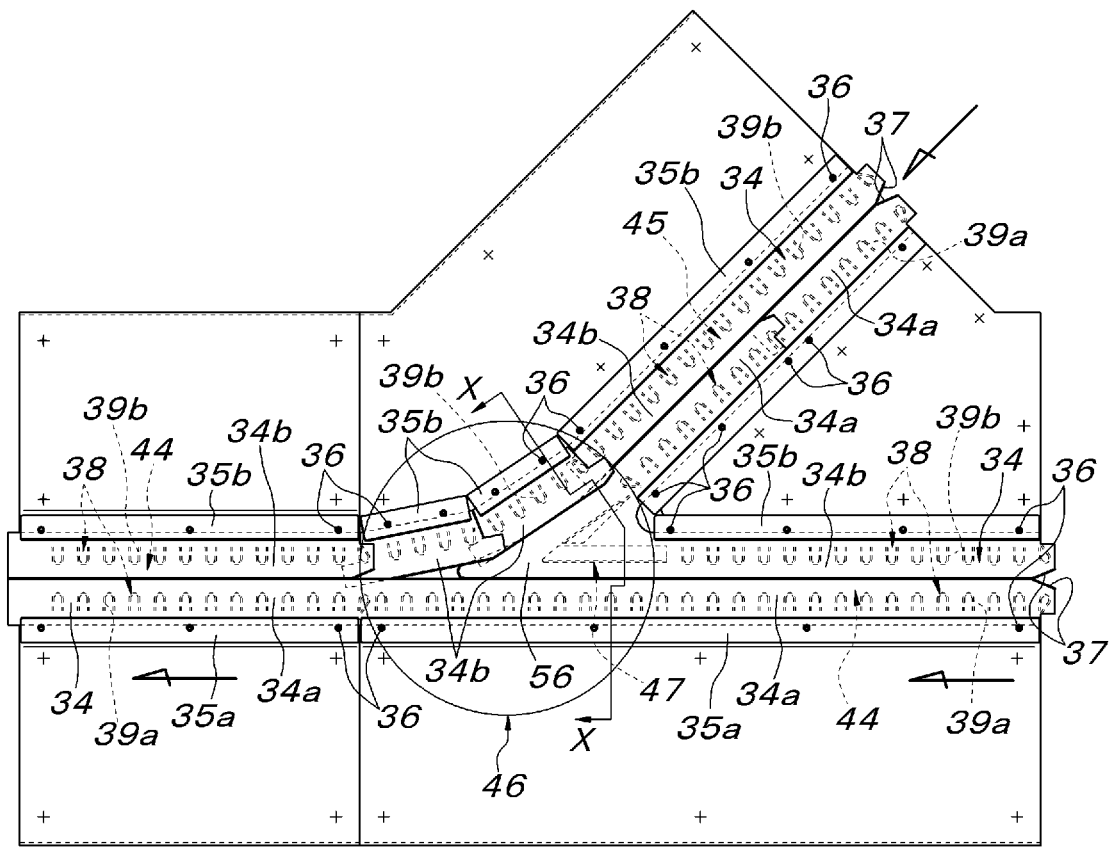
FIG. 11A is a plan view showing a meeting portion in the traveling path.

In some cases, in the traveling path of the conveying traveling body 1, a meeting path section or a branching path section is provided. Although FIG. 11A shows a meeting path section 45, by incorporating a conventionally known path switching means, it can also be utilized as a branching path section in which the traveling direction of the conveying traveling body 1 is opposite. An embodiment of a case in which the present invention is applied and implemented to the meeting path section shown in FIG. 11A will be described below with reference to FIGS. 11A to 13B. The meeting path section 45 is connected to the rectilinear path section 44 obliquely with respect to the traveling direction of the conveying traveling body 1 in the rectilinear path section 44, and except for a meeting portion 46 which is triangular in plan view, in the rectilinear path section 44 and the meeting path section 45, the cover 34 and the auxiliary floor surface means 38 described in the embodiment discussed previously are adopted.

Figure 13A:
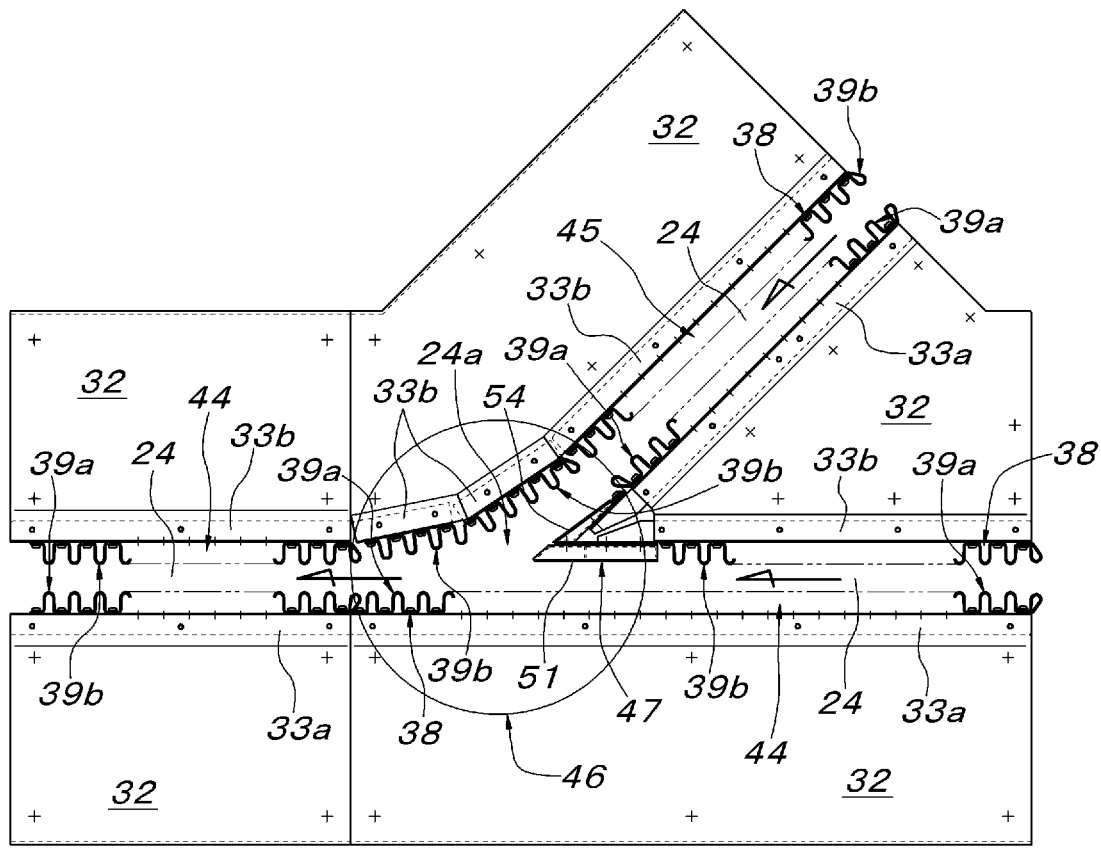
FIG. 13A is a plan view showing a state where the cover member on a slit is removed from FIG. 11A.

In the meeting portion 46, the slit 24 of the meeting path section 45 is connected to the slit 24 of the rectilinear path section 44, and thus, as shown in FIG. 13A, a space 24a in the shape of the letter V in plan view is formed. In a linear side of the V-shaped space 24a, the strip cover member 34a and the wavy strip elastic member 39a in the rectilinear path section 44 on the upstream side connected to the linear side are extended so as to be directly connected to the rectilinear path section 44 on the downstream side, and in an arc-shaped side of the V-shaped space 24a, the strip cover member 34b and the wavy strip elastic member 39b in the meeting path section 45 connected to the arc-shaped side are connected to the strip cover member 34b and the wavy strip elastic member 39b in the rectilinear path section 44 on the downstream side while being aligned in the shape of an arc. The strip cover member 34b and the wavy strip elastic member 39b in the rectilinear path section 44 on the upstream side and the strip cover member 34a and the wavy strip elastic member 39a in the meeting path section 45 which are to form an inner V-shaped corner portion in the V-shaped space 24a form a terminal end in a state where they are adjacent to each other in front of the V-shaped space 24a. To the terminal end portion, a V-shaped fixed member 47 is attached which enters toward the inside of the meeting portion 46 in the shape of the letter V, which narrows the width of the slits 24 of the rectilinear path section 44 and the meeting or branching path section 45 in the meeting portion 46 and which has a vertical plate surface.

The strip attachment plate 41 and the attachment plate portion 41a to which the wavy strip elastic member 39b in the rectilinear path section 44 on the upstream side with respect to the V-shaped space 24a and the strip attachment plate 41 and the attachment plate portion 41a to which the wavy strip elastic member 39a in the meeting path section 45 is attached are extended so as to protrude into the meeting portion 46 as attachment portions 48a and 48b of the V-shaped fixed member 47. The V-shaped fixed member 47 is configured with an intermediate member 50 which is attached to the attachment portion 48a on the side of the rectilinear path section 44 with a fastening tool 49 such as a bolt and a nut and which is formed in the shape of an elongated strip in plain view, a vertical plate member 51 whose upper side is attached to the side of the intermediate member 50 on the side of the slit 24, an intermediate member 53 which is attached to the attachment portion 48b on the side of the meeting path section 45 with a fastening tool 52 such as a bolt and a nut and which is formed in the shape of an elongated triangle in plain view, and a vertical plate member 54 whose upper side is attached to the side of the intermediate member 53 on the side of the slit 24. Both the intermediate members 50 and 53 are coupled and integrated, at the tip end portions thereof, with a fastening tool 55 such as a bolt and a nut, and have, at the upper ends thereof, horizontal plate members whose height is substantially equal to the height of the upper ends of the U-shaped portions 43 in the wavy strip elastic members 39a and 39b, and the respective vertical plate members 51 and 54 have a substantially equal height to the height of the U-shaped portions 43 in the wavy strip elastic members 39a and 39b.

Figure 13B:
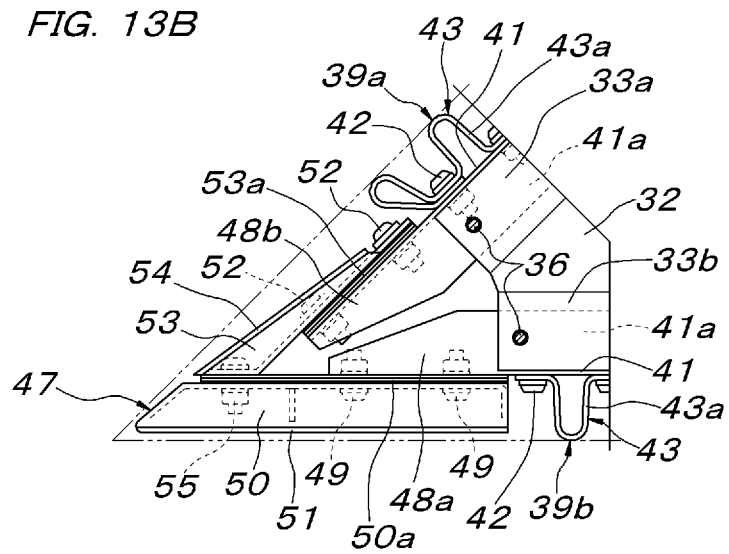
FIG. 13B is an enlarged plan view of a main portion of FIG. 13A.

It is noted that, as shown in FIG. 13B, in the vertical plate member 51 on the side of the rectilinear path section 44, its total length region which is linear in plain view is parallel to an extension surface of an imaginary vertical surface connecting the tip ends of the U-shaped portions 43 in the wavy strip elastic member 39b of the rectilinear path section 44 located on the upstream side and is placed in a position slightly retracted further outward than the extension surface. In the vertical plate member 54 on the side of the meeting path section 45, its proximal end portion is located, in plain view, around the proximal portion of the U-shaped portions 43 in the wavy strip elastic member 39a of the meeting path section 45 located on the upstream side, its tip end portion is placed in a position slightly retracted further outward than the extension surface of the imaginary vertical surface connecting the tip ends of the U-shaped portions 43 in the wavy strip elastic member 39a, thus the entire vertical plate member 54 is inclined, and its tip end portion is connected to the tip end of the vertical plate member 51 on the side of the rectilinear path section 44 via the tip end portion of the intermediate member 50 supporting the vertical plate member 51 in the shape of the letter V in plain view. Therefore, from the normal width between the wavy strip elastic members 39a and 39b, the width of the slit 24 on the side of the meeting path section 45 changes such that the width is temporarily widened at a place adjacent to the proximal end portion of the vertical plate member 54 and is then gradually narrowed according to the inclination of the vertical plate member 54.

Figure 11B:
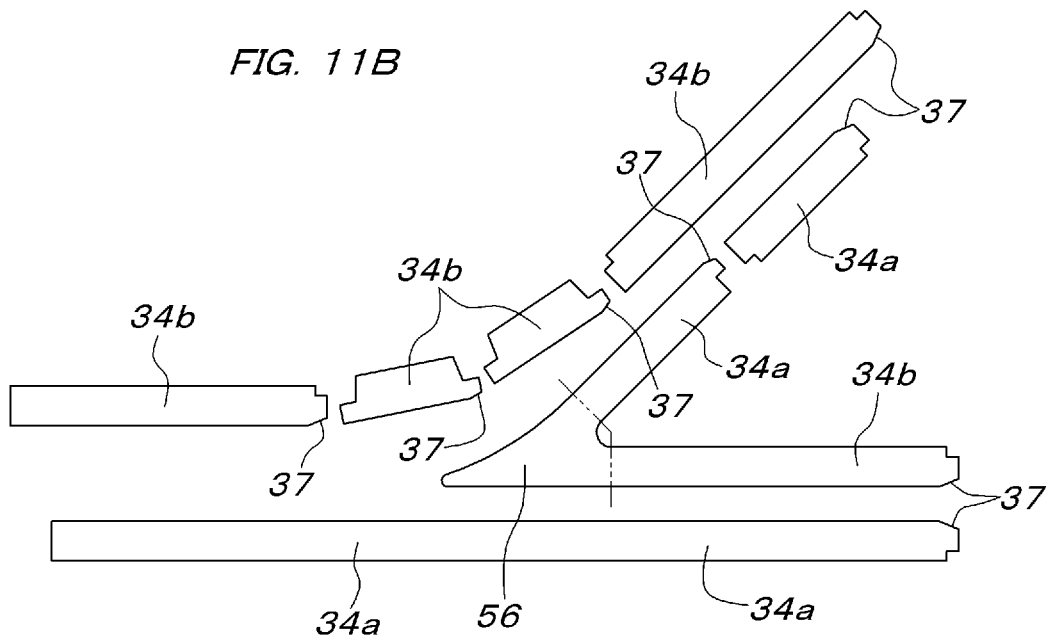
FIG. 11B is a plan view showing only a cover member used in the configuration of FIG. 11A.
Figure 12:
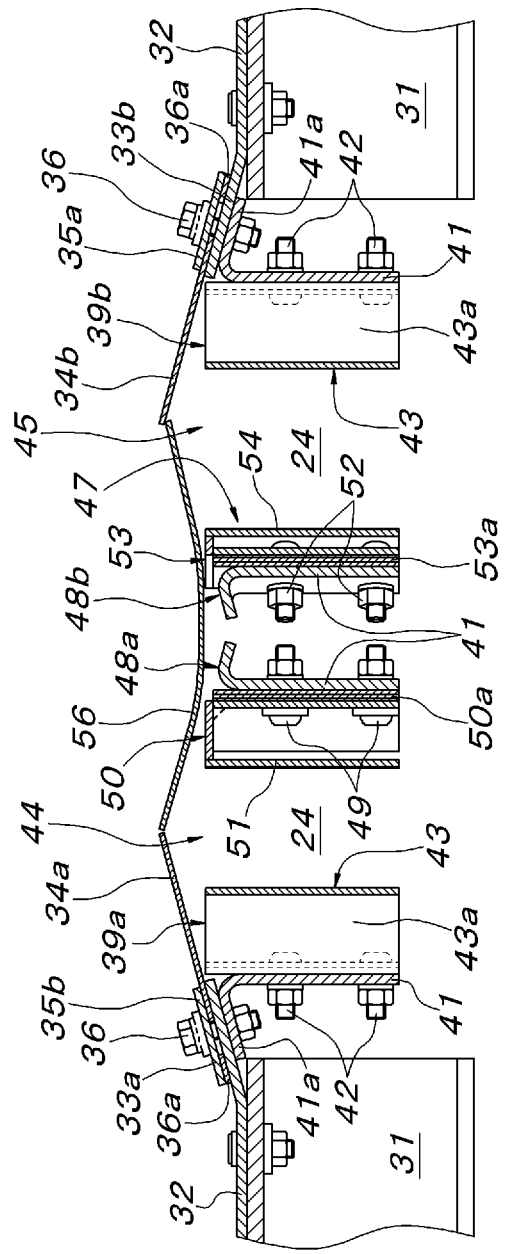
FIG. 12 is an enlarged cross-sectional view taken along line X-X in FIG. 11A.

On the other hand, the strip cover member 34b in the rectilinear path section 44 and the strip cover member 34a in the meeting path section 45 on the upstream side of the meeting portion 46 are connected, as shown in FIGS. 11A to 12, with a cover member 56 which covers the V-shaped fixed member 47, which enters toward the inside of the meeting portion 46, which is formed with an elastic plate member such as rubber, and which is formed in the shape of a triangle in plain view, and are integrally formed in the shape of the letter V in plain view. As a matter of course, the triangular cover member 56 closes a triangular space between the strip cover member 34a on the side of the rectilinear path section 44 in the meeting portion 46 and the strip cover member 34b aligned in the shape of an arc on the side of the meeting path section 45 in the meeting portion 46.

In the configuration of the meeting portion 46 described above, when the conveying traveling body 1 travels from the upstream side to the downstream side of the meeting portion 46 in the rectilinear path section 44, the two front and rear columnar support members 7 and 8 in the conveying traveling body 1 travel straight ahead with the length direction thereof parallel to the slit 24 in the center position of the width of the slit 24 in the rectilinear path section 44. Therefore, as described previously, the two front and rear columnar support members 7 and 8 travel straight ahead substantially without being brought into contact with the wavy strip elastic members 39a and 39b on both left and right sides in the auxiliary floor surface means 38 and the vertical plate member 51 of the V-shaped fixed member 47 in the meeting portion 46 while pushing and opening upward the strip cover members 34a and 34b on both left and right sides of the slit 24 and the triangular cover member 56 in the meeting portion 46. When the conveying traveling body 1 travels such that the meeting path section 45 on the upstream side of the meeting portion 46 meets the rectilinear path section 44 on the downstream side of the meeting portion 46, as described previously on the travel in the horizontal curved path section 29, the two front and rear columnar support members 7 and 8 in the conveying traveling body 1 travel obliquely with respect to the traveling direction. Therefore, in a section in which the columnar support members 7 and 8 move within the slit 24 in an oblique posture, the front end portion and the rear end portion of the columnar support members 7 and 8 travel while bending and deforming outward the wavy strip elastic members 39a and 39b on both left and right sides in the auxiliary floor surface means 38 against elasticity. At this time, since the width of the slit 24 in the place where the vertical plate member 54 of the V-shaped fixed member 47 in the meeting portion 46 is disposed is wider than the normal width between the wavy strip elastic members 39a and 39b, the columnar support members 7 and 8 are prevented from being brought into contact with the vertical plate member 54. In other words, the vertical plate member 54 of the V-shaped fixed member 47 in the meeting portion 46 is disposed so as to be separated outward from the movement track of the columnar support members 7 and 8 in this place.

As a matter of course, it is preferably configured such that, as shown in FIGS. 12 and 13B, when the intermediate members 50 and 53 are attached to the attachment portions 48a and 48b, shims 50a and 53a which are formed with a plurality of thin plates are interposed, the thickness of the shims 50a and 53a is adjusted so as to make it possible to adjust the amount of overhang of the vertical plate members 51 and 54 into the slit 24 such that the columnar support members 7 and 8 are prevented from being brought into contact with the surfaces of the vertical plate members 51 and 54 as much as possible. In addition, even if a situation is brought about where the columnar support members 7 and 8 are brought into contact with the surfaces of the vertical plate members 51 and 54, in order to minimize friction therebetween at the time of contact, it is possible to provide a measure in advance such as to stick a sheet (film) for smooth sliding onto the surfaces of the vertical plate members 51 and 54.

As described above, when the conveying traveling body 1 travels straight ahead through the meeting portion 46 in the rectilinear path section 44, and when the conveying traveling body 1 travels through the meeting portion 46 from the meeting path section 45 so as to meet the rectilinear path section 44, the left and right pair of the strip cover members 34a and 34b in the cover 34 covering the top of the slit 24 and any one of the left and right sides of the triangular cover member 56 in the meeting portion 46 are pushed and opened upward against the elasticity of themselves by the columnar support members 7 and 8. In a case where a heavy foreign object or a foot of the operator is caught into the slit 24 when the conveying traveling body 1 does not travel, the strip cover members 34a and 34b or the triangular cover member 56 in the meeting portion 46 pushed down by the foreign object or the foot of the operator is received by the wavy strip elastic members 39a and 39b of the auxiliary floor surface means 38 located on the lower side thereof or the V-shaped fixed member 47 in the meeting portion 46, with the result that the foreign object or the foot of the operator is prevented from dropping into the slit 24.

The floor conveyor of the present invention can be utilized in the assembly line of an automobile body and the like as a floor conveyor of a type in which a conveyed object support base portion on the upper side of a floor surface is supported on a conveying traveling body on the lower side of the floor surface via a columnar support member.

The invention claimed is:

1. A floor conveyor comprising:
a conveyed object support base portion on an upper side of a floor surface supported on a conveying traveling body on a lower side of the floor surface via a columnar support member that penetrates, in a vertical direction, a slit formed in the floor surface along a traveling path of the conveying traveling body;
a horizontal curved path section of the traveling path;
an auxiliary floor surface means for narrowing a width of the slit disposed at least in the horizontal curved path section of the traveling path;
the auxiliary floor surface means being configured by juxtaposing, in a length direction of the slit, protruding members protruding from a side of the slit to a center side of the slit at intervals;
each of the protruding members including a plate-shaped portion along a perpendicularly vertical direction and being held and biased by an elastic force in a protruding posture in which the protruding member protrudes to the center of the slit;
when the protruding member is brought into contact with the columnar support member, the protruding member being operable to move in a movement direction of the columnar support member against elasticity so as to allow passage of the columnar support member;
each of the protruding members in the auxiliary floor surface means being configured with a vertically long rectangular elastic plate having a plate surface in the perpendicularly vertical direction;
each of the protruding members being attached so as to have the protruding posture; and
when the protruding member is brought into contact with the columnar support member, the protruding member elastically deforms in the movement direction of the columnar support member.

2. The floor conveyor according to claim 1, wherein:
the auxiliary floor surface means is formed by bending a strip elastic member in a shape of waves,
the two protruding members comprise U-shaped portions protruding to the center of the slit, and
a plate portion which is located between the adjacent U-shaped portions and which is along the length direction of the slit serves as an attachment plate portion.

3. The floor conveyor according to claim 1, wherein:
a strip attachment plate along the length direction of the slit is attached to a lower side of a side edge of a floor plate member forming the slit which is adjacent to the slit such that a plate surface thereof is in the perpendicularly vertical direction, and the protruding member in the auxiliary floor surface means is attached to the plate surface of the strip attachment plate on the side of the slit.

4. The floor conveyor according to claim 1, wherein:
the protruding members in the auxiliary floor surface means are attached to both left and right sides of the slit.

5. The floor conveyor according to claim 4, wherein:
a cover covers the entire width of the slit on an upper side of the auxiliary floor surface means, and
the cover is configured with a left and right pair of strip cover members which are adjacent to each other in a center position of the width of the slit and which are formed with elastic plate members.

6. The floor conveyor according to claim 5, wherein:
floor plate members are provided on both sides of the slit which have side edges adjacent to the slit, the floor plate members having strip regions, and proximal portions of the left and right pair of the strip cover members are placed on upper sides of the strip regions of the floor plate members,
the protruding members in the auxiliary floor surface means are attached to attachment plate portions of strip attachment plates, and the attachment plate portions are overlaid on lower sides of the strip regions, and
the proximal portions of the strip cover members and the attachment plate portions are attached to the strip regions in the floor plate members with fasteners.

7. The floor conveyor according to claim 6, wherein:
the auxiliary floor surface means is not attached in at least a specific path section of a rectilinear path section in the traveling path of the conveying traveling body, and
widths of the strip regions in the floor plate members on both sides of the slit which have side edges adjacent to the slit are widened such that the side edges of the strip regions adjacent to the slit reach, in plan view, positions corresponding to tip ends of the protruding members in the auxiliary floor surface means.

8. The floor conveyor according to claim 5, wherein:
in the traveling path of the conveying traveling body, in a meeting or branching portion V-shaped in plan view in which a meeting or branching path section is obliquely connected to the rectilinear path section, a left and right pair of the auxiliary floor surface means which are additionally provided in the slit of the rectilinear path section and the auxiliary floor surface means on a side adjacent to the V-shape in plan view of the left and right pair of the auxiliary floor surface means which are additionally provided in the slit of the meeting or branching path section form a terminal end directly in front of the meeting or branching portion,
to the terminal end portion, a V-shaped fixed member is attached which enters toward an inside of the meeting or branching portion in a V-shape, which narrows the widths of the slits in the rectilinear path section of the meeting or branching portion and in the meeting or branching path section and which has a vertical plate surface, and
the left and right pair of the strip cover members which are additionally provided in the slit of the rectilinear path section and the strip cover member on a side adjacent to the V-shape in plan view of the left and right pair of the strip cover members which are additionally provided in the slit of the meeting or branching path section are connected with a cover member which covers the V-shaped fixed member, which enters toward the inside of the meeting or branching portion, which is formed with an elastic plate member, and which is formed in a shape of a triangle in plan view.

* * * * *